United States Patent Office 2,822,366
Patented Feb. 4, 1958

2,822,366

SULFONIC ACID DERIVATIVES AND METHODS OF MAKING THE SAME

Hermann Haas, Dusseldorf-Holthausen, and Wolfgang Gündel, Dusseldorf-Oberkassel, Germany, assignors to Böhme Fettchemie G. m. b. H., Dusseldorf, Germany, a corporation of Germany No Drawing. Application October 29, 1954
Serial No. 465,745

Claims priority, application Germany November 7, 1953

11 Claims. (Cl. 260—302)

This invention relates to sulfonic acid derivatives of organic compounds containing a

group, and more particularly to sulfonic acid derivatives of such organic compounds which, in their tautomeric form, are capable of forming salts containing the characteristic group

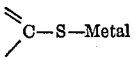

as well as to methods for making such sulfonic acid derivatives.

In a co-pending application, Serial No. 443,147, filed July 13, 1954, we have disclosed a process for the production of derivatives of thiourea containing sulfonic acid groups and derivatives of such compounds substituted at the nitrogen atoms, wherein one or both of the nitrogen atoms have at least one hydrogen atom still attached thereto, which comprises reacting such compounds with sultones. These thiourea derivatives include also those compounds which have an acid reaction because of the substituents attached thereto, and which form salts in their thiol form. By reacting such thiourea compounds in the form of their salts, particularly their alkali metal salts, with propanesultone, for example, it is possible to obtain sulfonic acid salts which contain the following characteristic group:

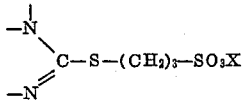

wherein X represents a metal atom.

We have now found that the reaction can be carried out quite generally with compounds which contain a

group and form, in their tautomeric form, salts containing the group

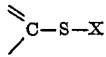

wherein X represents a metal atom, instead of only with thiourea derivatives having two nitrogen atoms attached to the carbon atom, as disclosed in said co-pending application.

For example, an organic thio-compound which contains a

group and will form a salt containing the group

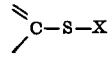

in its tautomeric form, as above described, can be reacted with a sultone to yield a sulfonic acid derivative containing the characteristic structure

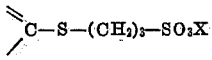

wherein X again represents a metal atom.

The above general class of organic thio-compounds which will react with sultones in the above-described manner includes, for example, the thiocarbonic amides, such as thioacetanilide, which contain the characteristic group

Such characteristic groups may also be repeated in the molecule, such as, for example, in di-thio-oxamide

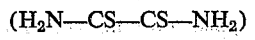

The reaction in accordance with our present invention will also take place between cyclic compounds containing the general characteristic group; for example, between rhodanine and a sultone.

Sultones which may advantageously be employed in the reaction in accordance with our present invention include, for example, 1,3-propane sultone, 1,4-butane sultone, technical mixtures of 1,3- and 1,4-butane sultone, isopentane sultone, as well as other aliphatic sultones. Such aliphatic sultones may also carry hydrocarbon substituents.

Furthermore, the reaction will also take place with sultones in which carbon atoms of a cycloaliphatic or aromatic ring system form a part of the sultone ring, such as, for example, in tolylsultone, 1,8-naphthylsultone, and the like.

The reaction between sultones and the organic thio-compounds in accordance with our invention takes place very smoothly, and in many cases it is highly exothermic. It may be carried out either in the absence or in the presence of inert solvents and/or diluents, such as, for example, low-molecular alcohols or other organic solvents. Finally, the reaction will also take place when the reactants are present in the form of their aqueous solutions.

The following examples will further illustrate our invention and enable persons skilled in the art to understand the invention more completely. However, it is understood that the invention is not limited to the specific reactants or conditions recited in the examples.

*Example 1*

15.1 gm. of thioacetanilide were dissolved in 100 cc. of a 1 N methanolic sodium methylate solution. Thereafter 12.2 gm. of molten propane sultone were added to this solution in small portions. The reaction mass was exteriorly cooled during the addition of the sultone. Immediately after the addition of the sultone was begun the reaction product began to separate out in solid form. After the vigorously exothermic reaction had subsided and the reaction mass was permitted to cool to substantially room temperature, it was then heated to 50-60° C. for 15 minutes. The resulting crystalline slurry was then filtered by suction, washed with methanol, and finally dried. The crystalline product was then recrystallized from a mixture of methanol and ethanol. The recrystallized product had a faint yellow-pinkish color, and was found to have the following structural formula:

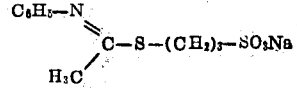

The yield was practically quantitative.

Example II 14.7 gm. (1/10 mol) of rhodanine, prepared by the method of Nencki (Journal der Praktischen Chemie (2), vol. 16, p. 2), were added to a sodium ethylate solution, prepared from 2.3 gm. sodium and 200 cc. absolute ethyl alcohol. Thereafter, 12.2 gm. of propane sultone were added to the above solution. An oily reaction product separated out after a short period of time, which later changed into a crystalline mass. This reaction product was then filtered and separated from the mother liquor, and finally dried over $P_2O_5$. The dry, crystalline product had a faintly red color and was highly hygroscopic. Its structural formula was found to be

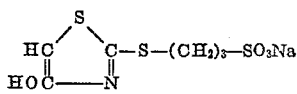

having the nomenclature rhodanine-S-propane-ω-sodium sulfonate.

Example III 16.5 gm. of thioacet-p-toluidide were dissolved in 100 cc. of a 1 N methanolic sodium methylate solution. 13.6 gm. of 1,4-butane sultone were added to this solution. After standing for ten minutes the mixture was heated to 60° C. for one hour. After cooling, the resulting crystalline slurry was filtered by suction, washed with methanol, and finally dried. The yield was practically quantitative. The product was found to have the following structural formula:

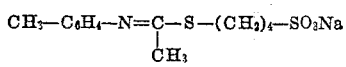

Example IV 15.1 gm. of thioacetanilide were dissolved in 100 cc. of a 1 N methanolic sodium methylate solution. To this solution were added 13.6 gm. of the technical mixture of 1,3-butane sultone and 1,4-butane sultone, which is obtained according to the method of Helberger (Ann. 562, p. 562 ff). The reaction mass was exteriorly cooled during the addition of the sultone. After the exothermic reaction had subsided it was heated to 60° C. for 30 minutes. After cooling, the resulting crystalline slurry was filtered by suction, washed with methanol, and finally dried. The yield was practically quantitative.

Example V 15.1 gm. of thioacetanilide were dissolved in 100 cc. of a 1 N methanolic sodium methylate solution. 17 gm. of tolylsultone were added to this solution. After standing for ten minutes the mixture was heated to 60° C. for one hour. After cooling, the resulting crystalline slurry was filtered by suction, washed with methanol, and finally dried. The yield was practically quantitative. The product was found to have the following structural formula:

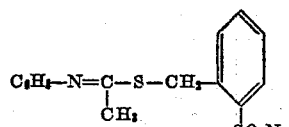

Example VI 21.3 gm. of thiobenzanilide were dissolved in 100 cc. of a 1 N methanolic sodium methylate solution. Thereafter 12.2 gm. of molten propane sultone were added to this solution in small portions. The reaction mass was exteriorly cooled during the addition of the sultone. Immediately after the addition of the sultone was begun the reaction product began to separate out in solid form. After the vigorously exothermic reaction had subsided and the reaction mass was permitted to cool to substantially room temperature, it was then heated to 50–60° C. for 15 minutes. The resulting crystalline slurry was then filtered by suction, washed with methanol, and finally dried. The crystalline product was found to have the following structural formula:

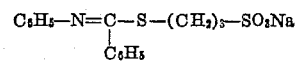

The yield as practically quantitative.

The products recovered from the reaction in accordance with our invention possess valuable insecticidal and fungicidal properties, and are also important intermediate products in the manufacture of other fungicides and insecticides as well as of pharmaceutical compounds.

While we have given certain specific embodiments of our invention, we wish it to be understood that changes and modifications can be made therein without departing from the broader spirit of our invention or the scope of the appended claims.

We claim:

1. Compounds having a structural formula selected from the group consisting of

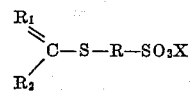

and

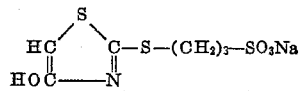

wherein R is selected from the group consisting of lower alkyl with at least 3 carbon atoms and aryl, $R_1$ is selected from the group consisting of $C_6H_5$—N= and lower alkyl-$C_6H_4$—N=, $R_2$ is selected from the group consisting of lower alkyl and aryl, and X is selected from the group consisting of hydrogen and alkali metal.

2. Compounds having a structural formula selected from the group consisting of

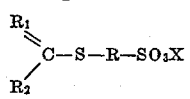

and

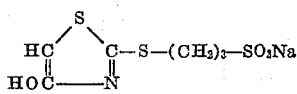

wherein R is lower alkyl with at least 3 carbon atoms, $R_1$ is selected from the group consisting of $C_6H_5$—N= and lower alkyl-$C_6H_4$—N=, $R_2$ is selected from the group consisting of lower alkyl and aryl, and X is selected from the group consisting of hydrogen and alkali metal.

3. As a new compound, the sulfonic acid derivative of an organic thio-compound, having the structural formula

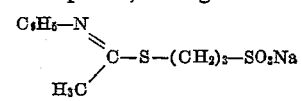

4. As a new compound, the sulfonic acid derivative of an organic thio-compound, having the structural formula

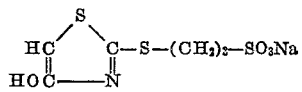

5. As a new compound, the sulfonic acid derivative of an organic thio-compound, having the structural formula

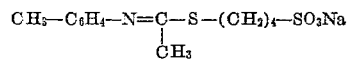

6. As a new compound, the sulfonic acid derivative of an organic thio-compound, having the structural formula

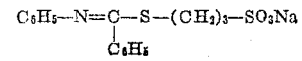

7. As a new compound, the sulfonic acid derivative of an organic thio-compound produced by a reaction between thioacetanilide and the technical mixture of 1,3-butane sultone and 1,4-butane sultone.

8. The process of producing sulfonic acid compounds having a structural formula selected from the group consisting of

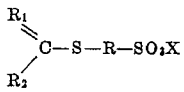

and

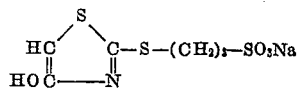

wherein R is selected from the group consisting of lower alkyl with at least 3 carbon atoms and aryl, $R_1$ is selected from the group consisting of $C_6H_5$—N= and lower alkyl-$C_6H_4$—N=, $R_2$ is selected from the group consisting of lower alkyl and aryl, and X is selected from the group consisting of hydrogen and alkali metal, which comprises subjecting a compound having a structural formula selected from the group consisting of

and

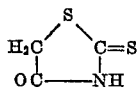

wherein $R_2$ has the meaning above indicated and $R_3$ is selected from the group consisting of $C_6H_5$—NH— and lower alkyl-$C_6H_4$—NH— to a condensation reaction with a sultone selected from the group consisting of lower alkyl sultones and aryl sultones in the presence of an alkali, and separating the reaction product from the reaction mass.

9. The process of producing sulfonic acid compounds having a structural formula selected from the group consisting of

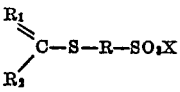

and

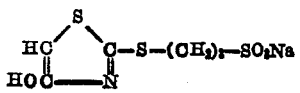

wherein R is selected from the group consisting of lower alkyl with at least 3 carbon atoms and aryl, $R_1$ is selected from the group consisting of $C_6H_5$—N= and lower alkyl-$C_6H_4$—N=, $R_2$ is selected from the group consisting of lower alkyl and aryl, and X is selected from the group consisting of hydrogen and alkali metal, which comprises subjecting a compound having a structural formula selected from the group consisting of

and

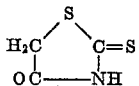

wherein $R_2$ has the meaning above indicated and $R_3$ is selected from the group consisting of $C_6H_5$—NH— and lower alkyl-$C_6H_4$—NH— to a condensation reaction with a lower alkyl sultone in the presence of an alkali, and separating the reaction product from the reaction mass.

10. The process of producing a compound having the structural formula $$C_6H_5-N\diagdown C-S-(CH_2)_3-SO_3Na \diagup H_3C$$

which comprises reacting propane sultone with a solution of thioacetanilide in methanolic sodium ethylate, and separating the reaction product from the reaction mass.

11. The process of producing rhodanine-S-propane-ω-sodium sulfonate which comprises reacting propane sultone with a solution of rhodanine and sodium in ethyl alcohol, and separating the reaction product from the reaction mass.

References Cited in the file of this patent

UNITED STATES PATENTS

| | | |
|---|---|---|
| 2,483,416 | Jansen et al. | Oct. 4, 1949 |
| 2,580,476 | Sprague | Jan. 1, 1952 |
| 2,672,463 | Huebner | Mar. 16, 1954 |

OTHER REFERENCES

Helberger: Chem. Abstracts, vol. 41, vol. 4101 (1947).
Helberger et al.: Liebigs Ann., vol. 565, pp. 22–35 (1949).

U. S. DEPARTMENT OF COMMERCE
PATENT OFFICE

CERTIFICATE OF CORRECTION

February 4, 1958

Patent No. 2,822,366

Hermann Haas et al.

It is hereby certified that error appears in the printed specification of the above numbered patent requiring correction and that the said Letters Patent should read as corrected below.

Column 2, lines 67 to 70, Example I, the formula should appear as shown below instead of as in the patent:

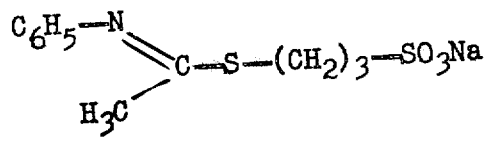

same column 2, line 71, Example I, and column 4, line 7, Example VI, for "yield as", each occurrence, read -- yield was --.

Signed and sealed this 15th day of April 1958.

(SEAL)
Attest:

KARL H. AXLINE
Attesting Officer

ROBERT C. WATSON
Commissioner of Patents